United States Patent
Budinski et al.

[11] Patent Number: 5,912,944
[45] Date of Patent: Jun. 15, 1999

[54] X-RAY CASSETTE

[75] Inventors: Kenneth G. Budinski; Jeffrey C. Robertson; Kenneth D. Corby; William C. Wendlandt, all of Rochester; Michael K. Budinski, Pittsford; David J. Steklenski, Rochester, all of N.Y.

[73] Assignee: Eastman Kodak Company, Rochester, N.Y.

[21] Appl. No.: 08/940,773

[22] Filed: Sep. 30, 1997

[51] Int. Cl.$^6$ .................................................. G03B 42/04
[52] U.S. Cl. .......................................... 378/182; 378/188
[58] Field of Search .................... 378/167, 169, 378/182, 177, 184, 187, 188

[56] References Cited

U.S. PATENT DOCUMENTS

| | | | |
|---|---|---|---|
| 2,817,020 | 12/1957 | Akers | 250/68 |
| 3,157,787 | 11/1964 | Kendziorski, Jr. et al. | 250/68 |
| 4,467,919 | 8/1984 | Bengtsson et al. | 206/455 |
| 5,246,523 | 9/1993 | Minnick et al. | 156/306.6 |
| 5,248,367 | 9/1993 | Minnick et al. | 156/306.6 |
| 5,248,368 | 9/1993 | Minnick et al. | 156/306.6 |
| 5,248,369 | 9/1993 | Minnick et al. | 156/306.6 |
| 5,248,373 | 9/1993 | Minnick et al. | 156/306.6 |
| 5,265,148 | 11/1993 | Bauer et al. | 378/182 |
| 5,413,901 | 5/1995 | Florens et al. | 378/182 X |
| 5,684,853 | 11/1997 | Fick et al. | 378/177 X |

FOREIGN PATENT DOCUMENTS 0 598 428 A1  11/1993  European Pat. Off. .

*Primary Examiner*—David P. Porta
*Attorney, Agent, or Firm*—WIlliam F. Noval

[57] ABSTRACT

A light weight x-ray cassette formed from Hylite which is an metal/polymer/metal material. The cassette comprises: a front panel and a back panel formed from the Hylite composite material with the front and the back panels being operatively hinged together by a hinging element attached to the panels so as to form a cavity between the panels; an x-ray film contained within the cavity between the first panel and the second panel; at least one intensifying screen held in contact with the x-ray film; and a latching element to open and close the cassette.

36 Claims, 5 Drawing Sheets

X-RAY CASSETTE

CROSS-REFERENCE TO RELATED APPLICATIONS

The present application is related to U.S. application Ser. No. 08/941,119, filed concurrently herewith and entitled, "STORAGE PHOSPHOR CASSETTE WITH REDUCED WEIGHT AND COST"

FIELD OF THE INVENTION

The invention relates generally to the field of radiography, wherein conventional silver halide films are used to capture radiographic images, and in particular to a light tight cassette, for receiving an x-ray film between two intensifying screens of the type customarily described as prompt emission stimuable phosphor intensifying screens.

BACKGROUND OF THE INVENTION

In the field of radiography, where conventional silver halide films are used to capture radiographic images, it is common to enclose an x-ray film, sensitized on both surfaces in a light tight cassette, between two intensifying screens of the type customarily described as prompt emission stimuable phosphor intensifying screens. Higher resolution images are produced by using an x-ray film sensitized on only one surface, in contact with a single intensifying screen.

As most radiographic procedures are carried out in normal room lighting, a primary requirement for an x-ray cassette is to shield the film from exposure by ambient light.

Since silver halide x-ray films are relatively insensitive to exposure by electromagnetic radiation in the wavelength range generally referred to as x-rays, intensifying screens are utilized to capture and convert x-rays into visible wavelength radiation, to which the film is relatively sensitive.

Prompt emission stimuable phosphor intensifying screens are manufactured by coating a layer of phosphor particles contained in a binder, such as latex, onto a smooth substrate. The substrate is chosen to be relatively flat, yet flexible, such as a polyester film with a thickness in the range of 0.004" to 0.015". The phosphors so chosen for such prompt emission stimuable phosphor intensifying screens are selected to absorb x-rays in the wavelength range normally used for medical x-ray procedures, and to emit visible wavelengths in the blue-green part of the spectrum, when said phosphors promptly return to their unexcited state, emitting said visible light substantially in all directions.

If a prompt emission stimuable phosphor intensifying screen is held in intimate contact with the sensitized surface of an x-ray film, then the light sensitive film only in close proximity to the point from which the emission occurred is exposed by said emission, thus sharply imaging each such point, whereas, if the surface of the intensifying screen is not in intimate contact with the film, the light emitted from each point within the intensifying screen will spread and expose a larger area on the film, overlapping the exposures from adjacent points within the intensifying screen, resulting in an unsharp image upon the film.

Thus, for cassettes in use as general radiography cassettes, an essential secondary requirement is to provide for intimate contact between an intensifying screen contained within the cassette and an x-ray film placed therein.

In a normal radiographic procedure, the patient, or portion thereof, is placed between an x-ray source, and an x-ray cassette containing two intensifying screens. When the patient is irradiated, the x-ray beam is selectively attenuated by differences in the density of the patient tissue and bone structure. When the imaging beam strikes the x-ray cassette, a portion of the beam is attenuated by the front panel. The remaining imaging beam enters the cassette, where a significant portion is absorbed by the first intensifying screen, which promptly emits visible light against the first sensitized surface of the film. The remaining x-ray beam then passes through the film, causing a small direct exposure to both sensitized surfaces. The majority of the yet remaining portion of the beam is absorbed by the second intensifying screen, which then emits visible light against the second sensitized surface of the film. The residual small portion of the imaging beam is further attenuated by a thin sheet of lead foil applied to the interior face of the back panel, leaving only a very small fraction of the original beam to escape through the back surface of the cassette.

To minimize irradiation of the patient, it is desirable to minimize the attenuation of the imaging beam by non-image forming portions of the x-ray cassette, thus, a third requirement for x-ray cassette design is the utilization, for the front panels of such cassettes, of materials which do not substantially attenuate an x-ray beam. Additionally, such front panels must provide for uniform attenuation, so as to not alter the pattern of attenuation created by the patient.

Materials which are lower in atomic weight are more transparent to x-rays, thus beryllium would be an excellent material for x-ray cassettes, were it not for its great cost, and toxicity. Thermoplastic materials which are primarily compounds of carbon, hydrogen, and oxygen are also suitable, although they generally lack structural strength and modulus of elasticity required to produce good film screen contact in larger size cassettes. Carbon fiber reinforced thermoset resins are commonly used, in spite of their great cost. Aluminum is generally suitable, in the wavelengths used for general radiography, however it is unsuitable at the longer wavelengths used in specialty procedures, such as mammography.

Commonly available x-ray cassettes comprise a front cover hingeably attached along a first edge to a back cover, with latch means provided along a second edge opposite said first edge, to maintain closure of said cassette, during an x-ray procedure, and to allow opening of said cassette for loading an unexposed x-ray film, and for removing an exposed x-ray film. Light lock means are provided around the perimeter of said covers to render said cassette light tight when said cassette is closed. Intensifying screens are each adhered to resilient foam pads, which are subsequently adhered to the interior surfaces of said covers. The thickness of the foam pads, and the stiffness of the foam material is chosen such that the form pads are partially compressed within the closed cassette, thus urging the intensifying screens into contact with an x-ray film placed therebetween.

Higher levels of contact pressure between screens and film produce more intimate contact, and help squeeze out air that may have been trapped between the film and screen surfaces when the cassette was closed, said entrapped air preventing intimate film/screen contact.

Higher internal pressures also result in greater cassette deformation, resulting in non-uniform internal pressures, and potential separation of perimeter light lock elements.

Currently available cassettes represent a series of compromises within which the various cassette designers have variously balanced the desire to have intimate film/screen contact against the practical aspects of the structural requirements dictated by high contact pressures, the attenuation levels of structurally superior materials, and the cost of cassette materials and manufacturing processes.

An example of one such commonly available general purpose radiographic cassette, manufactured by the Eastman Kodak Company, of Rochester, N.Y., and sold under the name "Kodak X__OMATIC Cassette", comprises two aluminum panels 0.063" thick, each being insert molded into a thermoplastic border material which hingeably connects the two panels, along one edge of each, and forms a series of cooperating perimeter ribs and grooves around three sides of each panel, for the purpose of excluding light from the closed cassette. An "L" shaped stainless steel structural member is attached to each of the two remaining edges with up to 24 rivets in the larger size cassettes. Two aluminum extrusions are also attached at the said remaining edges, to provide light lock structure along the fourth side of the closed cassette. One of said extrusion is attached adhesively, the other in conjunction with the process of attaching one of the "L" shapes, and utilizing the same rivets as used to attach the "L" shape. Latching of the cassette in the closed position is accomplished by engaging a latch piece, spot welded to one of the "L" shapes, with a hook, suspended from a pin, said pin supported by a knuckle plate, said knuckle plate adhesively bonded to the second "L" shape. A lever, also suspended from said pin is rotated to deflect said hook from its engaged position, to enable opening the cassette. Two springs urge the hook, and the lever, toward their first positions whereby the cassette is latched. A recess in one of the aluminum panels is formed by a stamping process, to provide clearance under the lever, to allow manual operation of the lever, when the cassette user desires to open the cassette.

To complete the cassette, a layer of lead foil is applied to the interior face of the back panel, and foam pads are then adhesively bonded to the interior of the first cover, and atop the lead foil, and the intensifying screens are adhesively bonded to the opposite sides of the foam pads, such that the phosphor coated surfaces of said screens are urged against one another, or against an x-ray film placed therebetween, when the cassette is closed and latched.

Prior to assembly, the aluminum panels are formed into a curved shape, to enable them to act as springs, applying pressure to the foam pads, to partially compress them, substantially uniformly, when the cassette is closed, for the purpose of applying pressure to the intensifying screens to urge them into intimate contact with the x-ray film placed within the cassette. Pressure in the range of 0.10 to 0.15 psi is attained in the currently marketed cassette, and this level of pressure demonstrates intimate contact over the entire area of the x-ray film, when tested in accordance with methods prescribed by the American College of Radiography.

The front cover of a cassette of the above described construction will attenuate 26% of an imaging beam generated at the x-ray wavelengths created by a 100 kv excitation voltage applied to an x-ray generator, with 3 mm aluminum filtration at the generator, with no scatter control, and with no other absorber in the beam. At slightly longer wavelengths generated at 80 kv excitation, the attenuation is 30%, and at yet longer wavelengths generated at 60 kv excitation, the attenuation reaches 36%.

Some cassettes are manufactured utilizing carbon fiber reinforced epoxy panels of equivalent structural performance, for the front cover only. Such carbon fiber panels will typically attenuate 1%, 2% and 2.5% of the above imaging beams, a significant decrease in attenuation, albeit, at a panel cost of ten to twenty times the cost of the vinyl clad aluminum panel it replaces.

The above-described cassette, featuring two vinyl clad aluminum panels, completely assembled, and including film and intensifying screens, in a 35×43 cm. size, as is commonly used for procedures such as chest x-ray, comprises 49 discrete components, including fasteners and adhesive applications, and weighs 5.70 pounds. Such a cassette has proven to be robust in usage, remaining serviceable for 10 years or more, experiencing many thousands of reloadings, an equivalent number of insertions and removals from various x-ray apparatus, occasional accidental drops, and in some cases, innumerable instances where the cassette is placed directly under a patient, and bears the weighs of the patient, as when the cassette is used for portable radiography at bedside.

While the above described cassette is widely utilized, it would be desirable to provide x-ray cassettes utilizing lower cost materials and/or processes; having equally high internal contact pressures, to ensure excellent image quality; while minimizing the imaging beam attenuation of the front panel of the cassette, to reduce patient irradiation levels. It would be further desirable to provide a cassette which is structurally equivalent to the current cassette; and which is lighter in weight, for portability. Furthermore, it would be desirable to reduce the number of discrete parts comprising an x-ray cassette assembly, to further reduce weight, and to further reduce parts manufacturing and assembly costs.

SUMMARY OF THE INVENTION

The present invention is directed to overcoming one or more of the problems set forth above. Briefly summarized, according to one aspect of the present invention, an x-ray cassette comprising: a front panel and a back panel formed from a material comprising a metal/polymer/metal sandwich, thereby creating a sandwich with a high modulus layer, low modulus layer, high modulus layer, the front and the back panels held together by fastening means to create a cavity between the panels; an x-ray film contained within the cavity between the first panel and the second panel held together by fastening means; and at least one intensifying screen held in contact with the x-ray film. The invention preferably employs aluminum as the metal sheets and polypropylene as the polymer layer.

An improved x-ray cassette has been designed and fabricated, utilizing prepainted panels of a composite aluminum/polypropylene/aluminum material manufactured by Hoogovens, Bv, of the Netherlands. This material, developed for use in the automotive industry, comprises a 0.064" thick solid polypropylene core, to each side of which is laminated a 0.008" thick aluminum skin. This construction is slightly stiffer than the 0.063" thick vinyl clad solid aluminum panel used previously, and is 70% lighter than the prior panel. The previous insert molded thermoplastic border is retained, as it provides excellent light integrity, excellent shock resistance, if the cassette should happen to be dropped, in addition to providing the hinge function to enable the opening and closing of the cassette.

There are multiple types of Hylite available from Hoogovens. Panels can be obtained with different core thicknesses, different skin thicknesses, and different skin material properties. The material choosen for the manufacture of the x-ray cassette features a core thickness of 0.064" with 0.008" thick skins of high temper aluminum, such as AA5182-H18. This structure provides a panel which is slightly stiffer than the prior art solid aluminum panel and giving it sufficient yield strength to prevent loss of panel shape in normal usage and providing sufficient dent resistance.

Two custom aluminum extrusions are utilized, one on each fourth side of each panel, to provide the structural reinforcement required, to cooperate to exclude light from entering through the fourth edge of the cassette. Furthermore, these extrusions each feature a channel section for receiving the fourth edges of the cassette panels, to provide for high strength adhesive bonding of the extrusions to the cassette panel edges. The above described extrusions, while providing structural equivalence to the prior cassette, along said fourth sides, result in a further weight reduction, and a reduction in the number of discrete parts required. Latching of the cassette is accomplished in a conventional manner. The lead foil, foam pads, and screens are assembled in the matter of the prior cassette.

The complete improved cassette for the same 35×43 cm. size as discussed for the prior art cassette weighs 3.75 pounds, a 34% reduction in overall weight.

The front cover of the improved cassette, while overall thicker than the front cover of the prior cassette, attenuates the imaging beam less. In the prior cassette, the majority of the beam attenuation was in the 0.063" thick aluminum panel, with the 0.010" thick vinyl covering contributing only slightly to the attenuation. The composite panel material utilized in the construction of the improved cassette has only 0.016" total thickness of aluminum, approximately 25% of the aluminum used in the prior panel, whereas the majority of the thickness of the improved cassette panel is comprised of polypropylene, which is highly transparent to x-rays. Measured attenuation of the improved panel is 8% at 100 kv excitation, 10% at 80 kv excitation, and 12% at 60 kv excitation. This attenuation performance is closer to the performance level of carbon fiber panels, however, the material cost for the aluminum/polypropylene/aluminum composite panel is approximately equivalent to the material cost for vinyl clad 0.063" solid aluminum panels, thus the improved cassette offers the potential for reducing patient irradiation, without incurring a severe cost penalty.

The invention envisions that stiffer or more stable material then conventional Hylite is desirable for x-ray cassettes. X-ray cassettes within the prior art as well as the present invention are maintained in a closed condition throughout the majority of their useful life. Thus cassette panels are under stress throughout normal lifetime requiring that stiff or stable material be employed in the construction of the cassette panels so that the panels retain their intended shape. Accordingly, various means are disclosed to provide stiffer panels or a more stable material to construct the panels to prevent "CREEP" which is the deformation of material over time at stress levels below the material yield point. The stiffening means can comprise embossed edges to the panels, a stiffening clip may be adhesively bonded to the panel, or hemming the edges of the panels. Stabilizing the core material to minimize creep can be accomplished by the addition of glass fibers or other fillers into the polypropylene, or by replacing the polypropylene with alternate thermoplastic materials having a higher creep resistance such as polycarbonate.

These and other aspects, objects, features, and advantages of the present invention will be more clearly understood and appreciated from a review of the following detailed description of the preferred embodiments and appended claims, and by reference to the accompanying drawings.

Advantageous Effect of the Invention

The present invention has the advantages of providing a cassette that is, essentially, as lightweight as the carbon fiber reinforced cassettes of the prior art that have a cost equivalent to the vinyl clad aluminum cassettes described in the prior art. The present invention also provides a cassette that has the structural strength of the prior art cassettes made from vinyl clad aluminum.

DETAILED DESCRIPTION OF THE INVENTION

Figure 1:
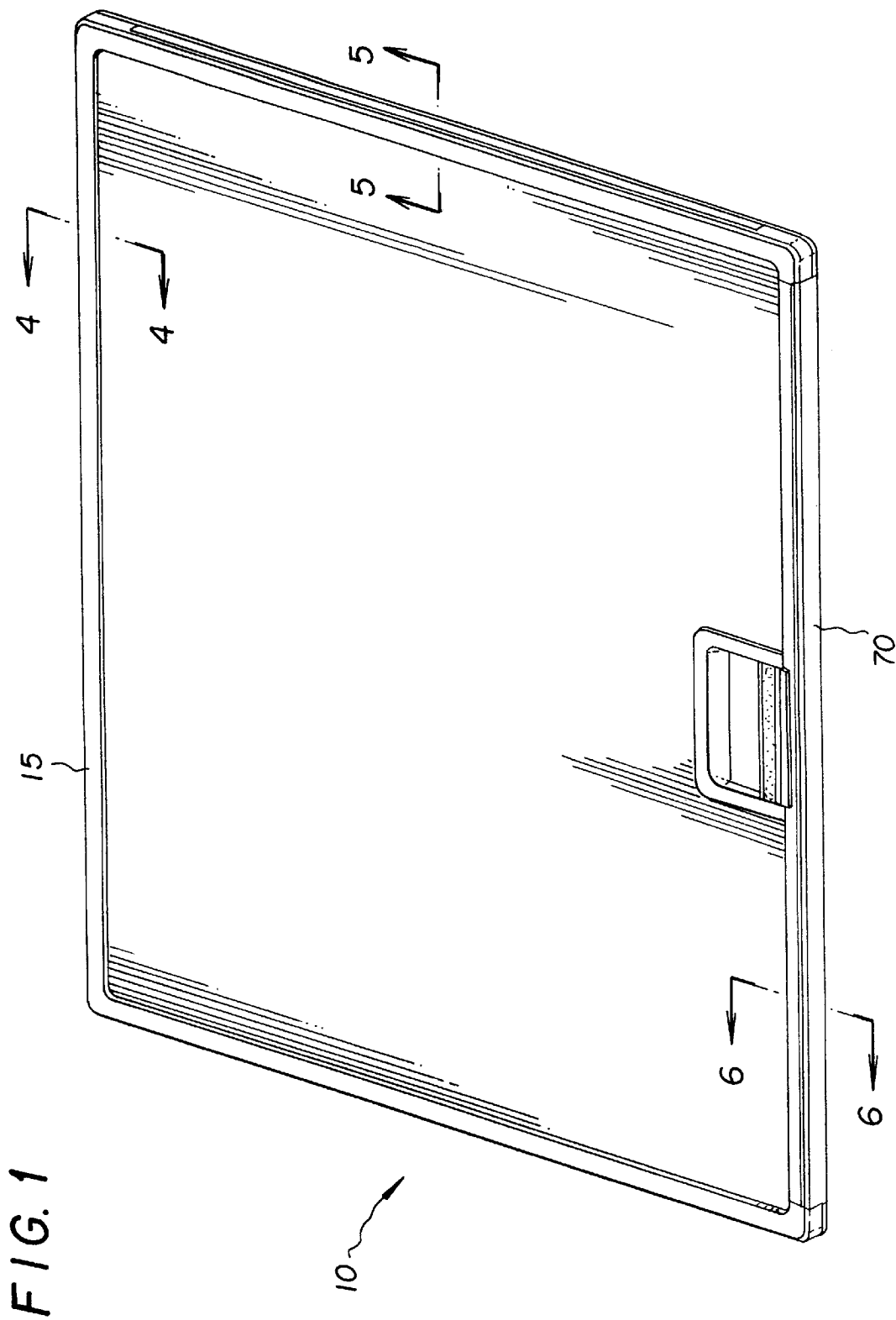
FIG. 1 is an oblique perspective view of an improved x-ray cassette, showing the cassette in a closed condition.
Figure 2:
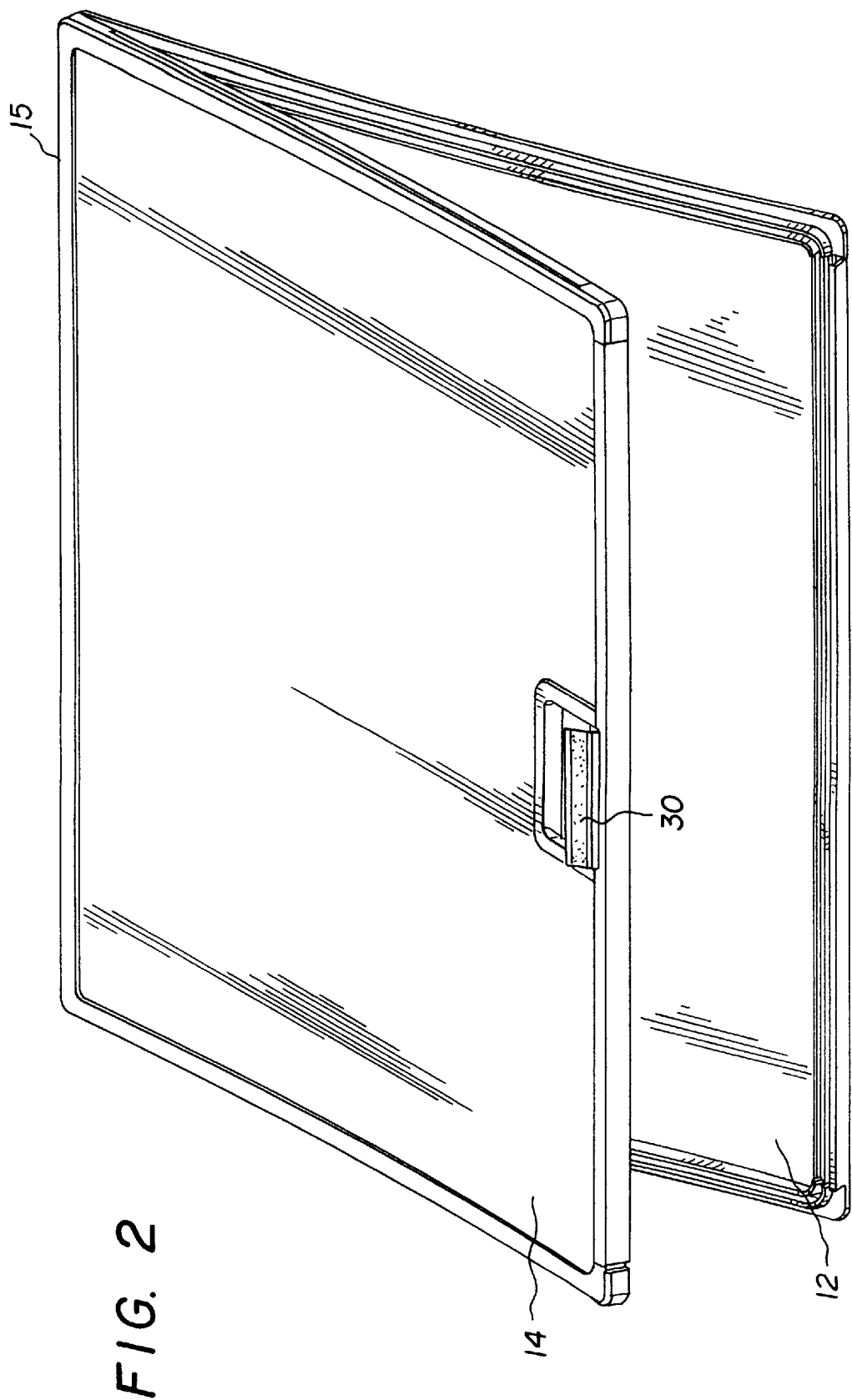
FIG. 2 is an oblique perspective view of the cassette of FIG. 1, showing the cassette in an unlatched state, and showing the cassette partially opened.

The following discussion is made referring to FIG. 1, which is an oblique perspective view of an improved x-ray cassette 10 in a closed condition, in conjunction with FIG. 2, which illustrates cassette 10 in a partially opened position.

The improved x-ray cassette 10 is designed to be fabricated with panels 12, 14 utilizing prepainted panels formed from a composite that preferably comprises aluminum/polypropylene/aluminum material manufactured by Hoogovens, Bv, of the Netherlands. The composite material, originally developed for use in the automotive industry, comprises a 0.064" thick solid polypropylene core to which is laminated on each side a 0.008" layer of aluminum. This composite material used in the construction of panels 12, 14 for cassette 10 is slightly stiffer than the 0.063" thick vinyl clad solid aluminum panel previously employed by the prior art. Moreover, the panels 12, 14 for cassette 10 made from this composite are 70% lighter than prior art cassette panels made from vinyl clad aluminum. The panels 12, 14 are formed from the composite material by traditional sheet metal forming methods such as roll forming, stamping, or stretch forming.

Border 16 is thermoplastic elastomer such as polyurethane that provides excellent light integrity, as well as excellent shock resistance. It is important that the cassette 10 be light tight. If cassette 10 should happen to be dropped border 16 prevents damage or misalignment of the cassette panels. Additionally, border 16 provides the hinge function to enable the opening and closing of the cassette 10. The opening and closing of cassette 10 is facilitated by latch 30 within latchwell 34.

Figure 3:
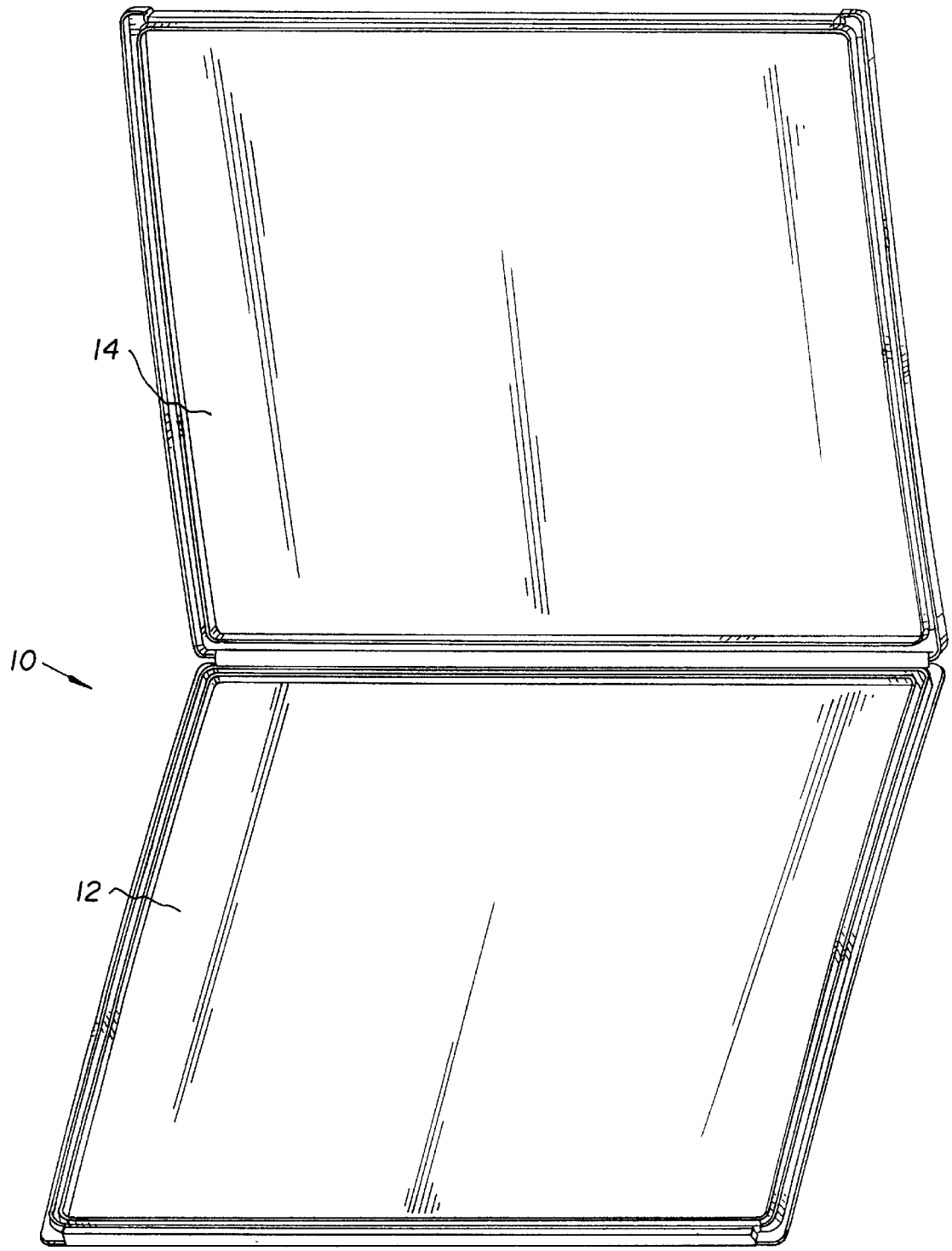
FIG. 3 is an oblique perspective view of the cassette of FIG. 1, showing the cassette opened to a position to receive an x-ray film.

FIG. 3 is an oblique perspective view of the cassette of FIGS. 1 and 2, in an opened position which is typically the position used to receive an x-ray film. The front panel 12 of the improved cassette, while thicker than the front cover of prior art cassettes, attenuates the imaging beam less. The composite panel material utilized in the construction of the improved cassette has only 0.016" total thickness of aluminum, approximately 25% of the aluminum used in the prior panel, whereas the majority of the thickness of the improved cassette panel is comprised of polypropylene, which is highly transparent to x-rays. Measured attenuation of the improved panel is 8% at 100 kv excitation, 10% at 80 kv excitation, and 12% at 60 kv excitation. This attenuation performance is closer to the performance level of carbon fiber panels, however, the material cost for the aluminum/polypropylene/aluminum composite panel is approximately equivalent to the material cost for vinyl clad 0.063" solid aluminum panels. Thus the improved cassette offers the potential for reducing patient irradiation, without incurring a severe cost penalty.

It is envisioned "CREEP" resistance to the cassette will be necessary for the cassette to hold its shape in extreme conditions. A more "CREEP" resistant cassette may be desirable than the cassette provided using aluminum/polypropylene/aluminum manufactured by Hoogoven Hylite BV. Accordingly, various means are disclosed to provide these "CREEP" resistant means. The "CREEP" strength can be increased by embossing the edges to the panels, by utilizing stiffening clips adhesively bonded to the outside edges of the panels, by a polycarbonate material used in place of the thermoplastic core, or utilization of a filler or reinforcement in the core. Such a filler can be selected from: a glass substance; talc; calcium silicate; calcium carbonate; or mica. It is envisioned that "CREEP" resistance can be obtained by adding reinforcement to the aluminum, to the polymer, by changing the aluminum alloy, or by changing the type of polymer core.

Figure 4:
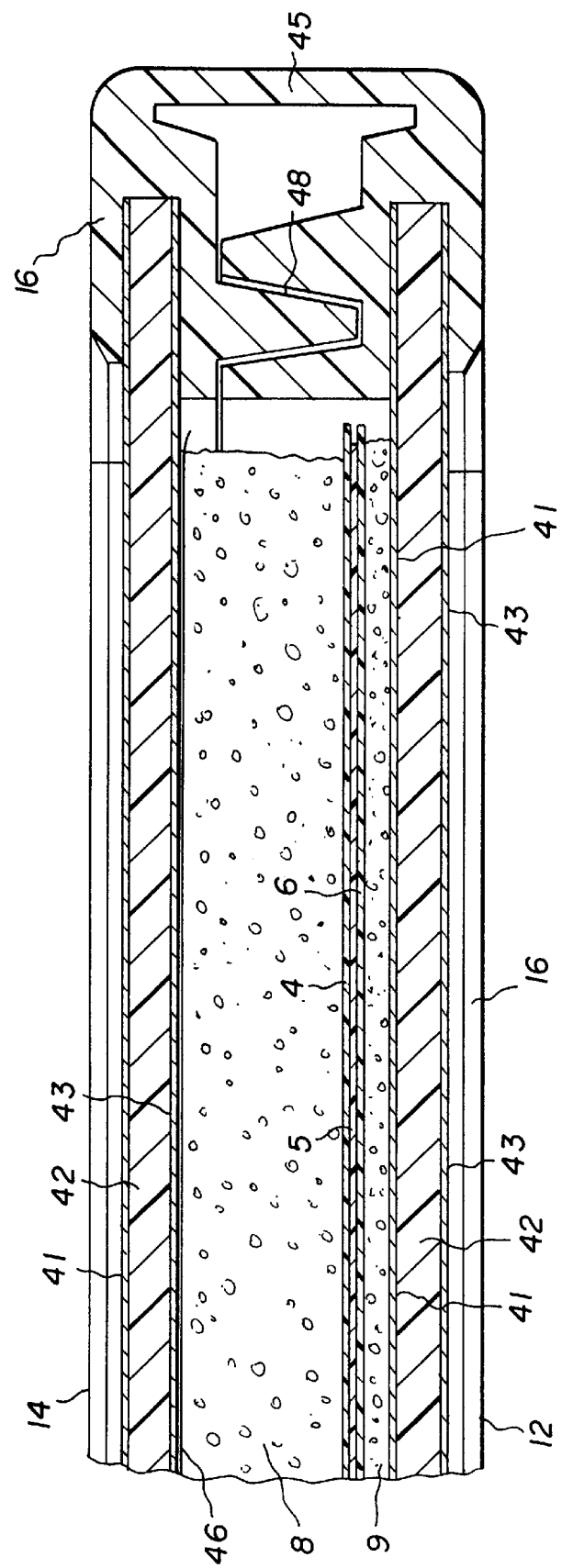
FIG. 4 is a partial cross-sectional view of the cassette of FIG. 1, taken along line A—A in FIG. 1, illustrating the construction of the side edge of the cassette.

FIG. 4 is a partial cross-sectional view of the cassette of FIG. 1, taken along line A—A in FIG. 1, illustrating the construction of cassette 10 in the area of the hinged edge 15. The front and back panels 12, 14 are illustrated comprising a polypropylene core 42 sandwiched between two thin skins of aluminum 41, 43. A urethane border 16 is formed on the outside edges of panels 12, 14. The border 16 is shown in more accurate detail around hinge 45. Hinge 45 has contours that create light lock features 48. X-ray film 5 is sandwiched between intensifying screens 4, 6. There are two resilient foam layers 8, 9 that apply force to intensifying screens 8, 9. The lead foil 46, foam layers 8, 9 and screens 4, 6 are assembled in a manner similar to prior art cassettes.

Figure 5:
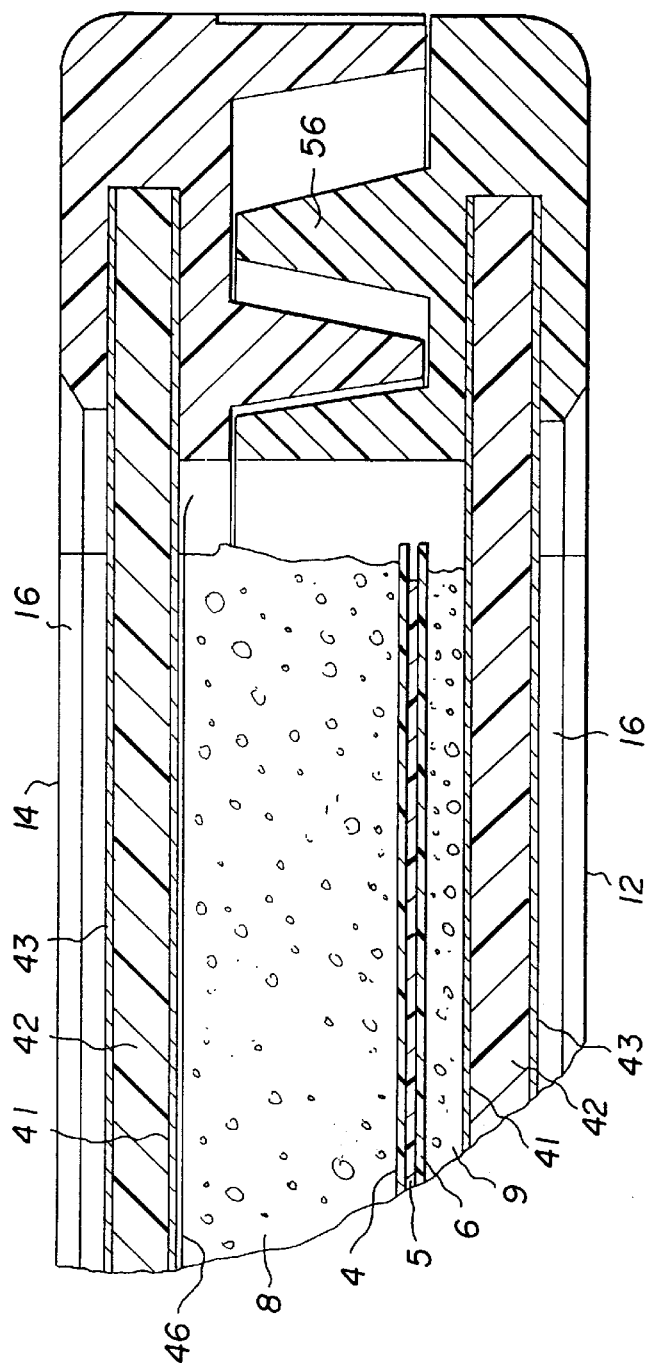
FIG. 5 is a partial cross-sectional view of the cassette of FIG. 1, taken along line B—B in FIG. 1, illustrating the construction of the hinge edge of the cassette.

FIG. 5 is a partial cross-sectional view of the cassette of FIG. 1, taken along line B—B in FIG. 1, illustrating the construction of the side edge of the cassette. The main feature illustrated by this FIG. 5 is the light lock 56 made from urethane. The front and back panels 12, 14 are illustrated comprising a polypropylene core 42 sandwiched between two thin strips of aluminum 41, 43. A urethane border 16 is formed on the outside edges of panels 12, 14. X-ray film 5 is sandwiched between intensifying screens 4, 6. There are two resilient foam layers 8, 9 that apply force to intensifying screens 8, 9.

Figure 6:
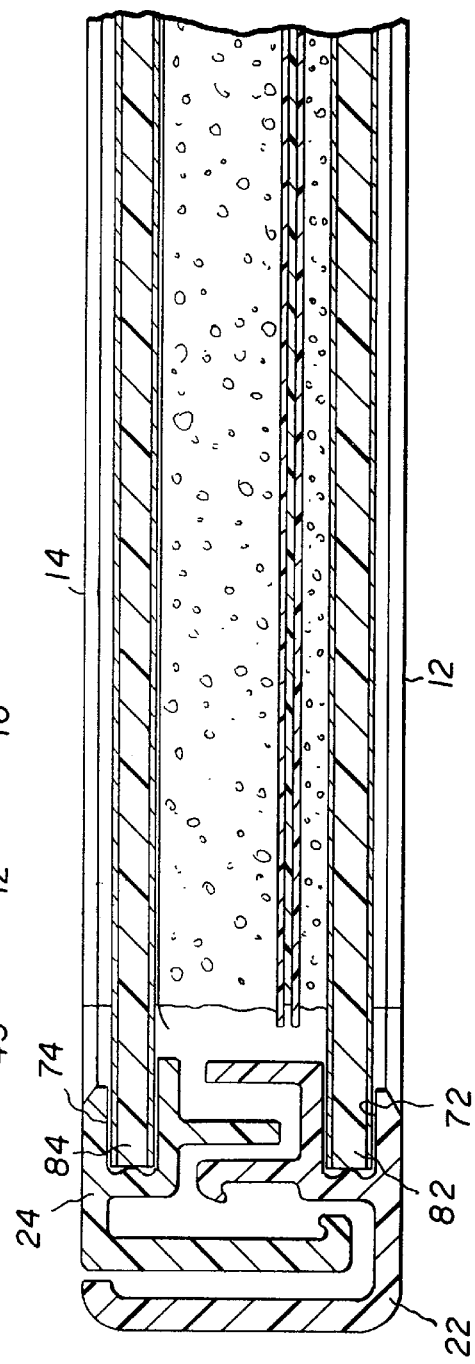
FIG. 6 is a partial cross-sectional view of the cassette of FIG. 1, taken along C—C in FIG. 1, illustrating the construction of the front edge of the cassette.

FIG. 6 is a partial cross-sectional view of the cassette of FIG. 1, taken along C—C in FIG. 1, illustrating the construction of the front edge 70 of the cassette. Two custom aluminum extrusions 22, 24 are utilized on front edge 70 of the cassette, to provide the structural reinforcement required for the cassette 10, and to cooperate to exclude light from entering through the front edge 70 edge of cassette 10. Furthermore, extrusions 22, 24 feature channel sections 72, 74 for receiving the edges 82, 84 of the cassette panels 12, 14 and to provide high strength adhesive bonding of the extrusions 22, 24 to the cassette panel edges 82, 84. The above described extrusions 22, 24, while providing structural equivalence to the prior cassette, along the front edge 70 of cassette 10, also result in a further weight reduction, and a reduction in the number of discrete parts required.

To facilitate understanding, identical reference numerals have been used, where possible, to designate identical elements that are common to the figures.

| PARTS LIST | |
|---|---|
| 4 | intensifying screen |
| 5 | x-ray |
| 6 | intensifying screen |
| 10 | cassette |
| 12 | panel |
| 14 | panel |
| 16 | border |
| 18 | |
| 20 | |
| 22 | extrusion |
| 24 | extrusion |
| 26 | |
| 28 | |
| 30 | latch |
| 32 | spring |
| 34 | |
| 36 | |
| 38 | |
| 40 | |
| 41 | aluminum strip |
| 42 | polypropylene core |
| 43 | aluminum strip |
| 45 | hinge |
| 46 | lead foil |
| 48 | light lock features |
| 70 | front edge side |
| 72 | channel |
| 74 | channel |
| 82 | panel edge |
| 84 | panel edge |

What is claimed is:

1. An x-ray cassette comprising:
   a front panel and a back panel formed from a composite material of at least three layers in a metal/polymer/metal sandwich, the front and the back panels being operatively hinged together by a hinging element attached to the panels so as to form a cavity between the panels;
   an x-ray film contained within the cavity between the first panel and the second panel;
   at least one intensifying screen held in contact with the x-ray film; and
   a latching mechanism to open and close the cassette.

2. The invention of claim 1 further comprising shock resistance means for impact resistance.

3. The invention of claim 2 wherein the shock resistance means further comprise a thermoplastic elastomer border.

4. The invention of claim 1 further comprising reinforcing means contained on at least one of the sides for increasing structural strength of the cassette.

5. The invention of claim 4 wherein the reinforcing means further comprises at least one extrusion formed from an opaque material on at least one of the side of the cassette.

6. The invention of claim 5 wherein the extrusion is formed from aluminum.

7. The invention of claim 5 wherein the extrusion has a channel formed that can operatively couple to an edge of a panel.

8. The invention of claim 1 wherein the polymer material further comprises polypropylene.

9. The invention of claim 1 wherein the intensifying screen is held against the X-ray film by a resilient element.

10. The invention of claim 9 wherein the element is a foam layer.

11. The invention of claim 1 further comprising stiffening means for adding rigidity to the cassette.

12. The invention of claim 11 wherein the stiffening means further comprises embossed edges to at least one of the panels.

13. The invention of claim 11 wherein the stiffening means further comprises at least one stiffening clip added to an outside edge of at least one of the panels.

14. The invention of claim 1 further comprising "CREEP" resistance means for stabilizing the panels.

15. The invention of claim 14 wherein the "CREEP" resistance means further comprises one of the following: inorganic particles, reinforcing fibers, and metal alloys.

16. An x-ray cassette comprising:

a front panel and a back panel formed from a material comprising a metal/polypropylene/metal sandwich, the front and the back panels held together by fastening means to create a cavity between the panels;

an x-ray film contained within the cavity between the first panel and the second panel; and at least one intensifying screen held in contact with the x-ray film.

17. The invention of claim 16 wherein the metal skins are selected from either magnesium, steel or aluminum.

18. The invention of claim 16 wherein the metal skins are selected from aluminum in a thickness range between 0.08 to 0.3 mm.

19. The invention of claim 16 wherein the polypropylene is selected in a thickness range between 0.5 to 2 mm.

20. The invention of claim 16 wherein the sandwich is held together by a bonding agent.

21. The invention of claim 16 where the fastening means further comprises a hinge element fastened to each the front panel and the back panel on a single side.

22. The invention of claim 21 further comprising resilient means for holding the intensifying screen against the X-ray film.

23. The invention of claim 22 wherein the resilient means further comprises a foam layer.

24. The invention of claim 23 further comprising a latch mechanism that secures an opposite side of each the front and the back panel from the side containing the hinge.

25. The invention of claim 24 further comprising a rigid structure formed at the opposite side.

26. The invention of claim 25 further comprising a first channel formed within the rigid structure to accommodate the front panel and a second channel formed within the rigid structure to accommodate the back panel.

27. The invention of claim 26 further comprising impact resistance means for protecting the cassette from mishandling damage.

28. The invention of claim 16 further comprising stiffening means for adding rigidity to the cassette.

29. The invention of claim 28 wherein the stiffening means further comprises embossed edges to at least one of the panels.

30. The invention of claim 29 wherein the stiffening means further comprises at least one stiffening clip added to an outside edge of at least one of the panels.

31. The invention of claim 16 further comprising "CREEP" resistance means for stabilizing the panels shape selected from one of the following: inorganic particles, reinforcing fibers, and metal alloys.

32. A method of making a lightweight cassette comprising the steps of:

providing a front panel and a back panel with at least the front panel formed from a metal/polypropylene/metal composite material;

fastening the front and back panels such that a cavity exists between them;

placing a sheet of X-ray film between the panels;

positioning at least one intensifying screen between the front panel and the X-ray film;

forming light tight means on the cassette for preventing light from entering the cassette; and wherein the providing step further comprises both panels being formed with the composite material and the positioning step further comprising positioning a second intensifying screen between the X-ray film and the back panel with a material that blocks X-rays contained between the second intensifying screen and the back panel.

33. The method of claim 32 further comprising the step of stiffening the cassette for added rigidity.

34. The method of claim 33 wherein said stiffening step further comprises adding embossed edges to at least one of the panels.

35. The method of claim 33 wherein said stiffening step further comprises adding at least one stiffening clip to an outside edge of at least one of the panels.

36. The invention of claim 33 further comprising "CREEP" resistance means for stabilizing the panels shape selected from one of the following: inorganic particles, reinforcing fibers, and metal alloys; and wherein said stiffening step further comprises adding glass to said polypropylene.

\* \* \* \* \*